A. E. COONEY.
AUTOMOBILE SUPPORT.
APPLICATION FILED MAR. 5, 1921.
1,398,086.
Patented Nov. 22, 1921.
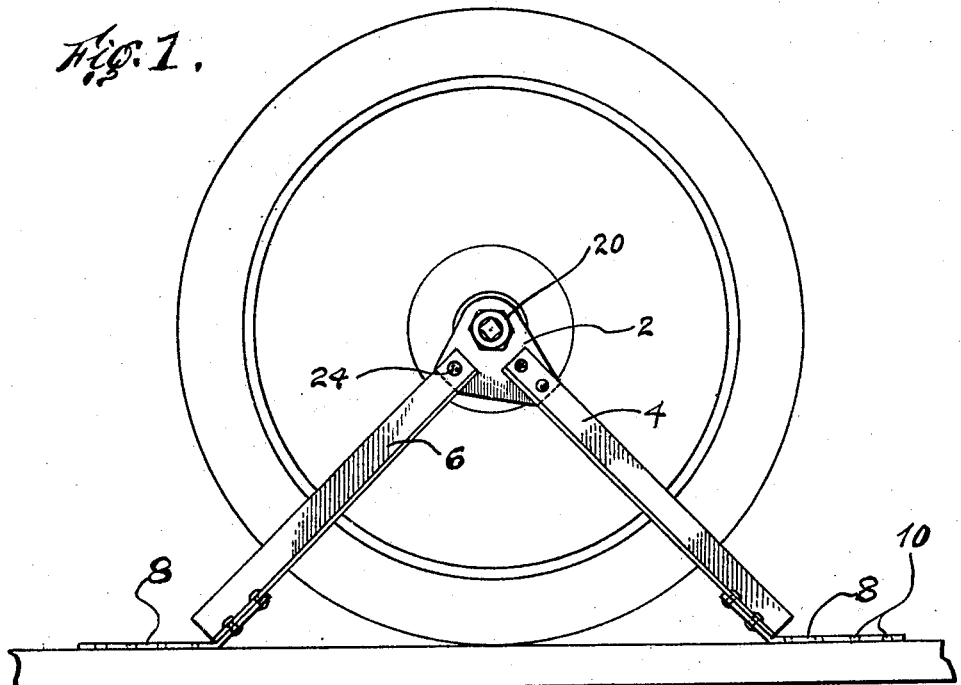
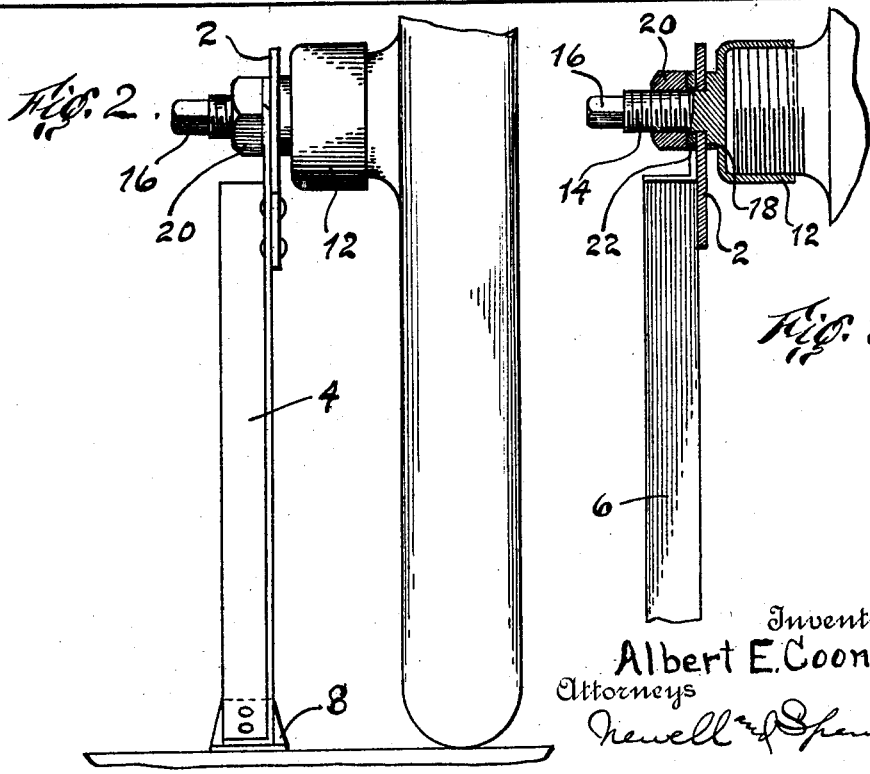
Inventor
Albert E. Cooney
Attorneys

UNITED STATES PATENT OFFICE.

ALBERT E. COONEY, OF DETROIT, MICHIGAN, ASSIGNOR TO DODGE BROTHERS, A CORPORATION OF MICHIGAN.

AUTOMOBILE-SUPPORT.

1,398,086.  Specification of Letters Patent.  Patented Nov. 22, 1921.

Application filed March 5, 1921. Serial No. 450,010.

*To all whom it may concern:*

Be it known that I, ALBERT E. COONEY, a citizen of the United States, residing at Detroit, Michigan, have invented certain new and useful Improvements in Automobile-Supports, of which the following is a clear, full, and exact description.

This invention relates to automobile supports and particularly to supports for use in shipping automobiles, and a general object of the invention is to provide an automobile support which is of simple construction, but which nevertheless can readily be adjusted to support the automobile at different heights from the floor and to adapt itself to different floor conditions, and which, when not in use, may be folded into compact form, whereby it can conveniently be returned for use again.

Although the invention is herein shown as arranged to support an automobile in proximity to the floor of a car, it will be understood that the invention is not restricted to use in supporting an automobile in a particular location in a car or to an embodiment having the relative proportions of the parts herein shown.

In the accompanying drawings—

Figure 1 is a side elevation of an automobile support embodying the present invention and illustrating its manner of use;

Fig. 2 is an end elevation of the support shown in Fig. 1; and

Fig. 3 is a vertical section through the structure shown in Fig. 1.

In the illustrated embodiment of the invention, the support is adapted to be connected to the wheel of the automobile to be supported in the manner disclosed in my co-pending application Serial No. 384,310 filed May 26, 1920, decking systems, and therefore the support comprises a plate 2, to which is rigidly connected a leg 4, herein shown as formed of angle iron, and to which is also pivotally connected a second leg 6 of similar construction, each of these legs preferably having at its end remote from the plate 2 a strap 8, by which it may be connected to the floor of the car as, for example, by driving nails or screws through the openings 10 in this strap.

To connect the plate 4 to the wheel of the automobile to be supported, a connecting member, like that shown in my co-pending application above identified, is substituted for the hub cap, this connecting member having a cap portion 12 adapted to be screwed upon the hub of the wheel and, integral therewith, a threaded stud 14 adapted to pass through an opening in the plate 2, the stud 14 being provided at its outer end with a squared portion 16 for use in screwing the cap part 12 of the connecting member upon the wheel hub. A shoulder 18 is preferably provided against which the plate 2 may be forced by a nut 20 threaded upon the stud 14, a lock washer 22 being preferably inserted between the nut 20 and the plate 2.

From the foregoing description it will be seen that by swinging the leg 6 upon its pivot 24 on the plate 2 to vary the angle between the legs 4 and 6, the automobile may be supported at different heights from the floor to accommodate wheels or tires of different diameters and that the support may be secured in its adjusted position by simply attaching the straps 8 to the floor of the car. When the support is not in use, the leg 6 may be swung on its pivot 24 into contact with the leg 4 and thus the support folded into compact form to be returned for repeated use.

What I claim as new is:

1. An automobile support comprising, in combination, a member adapted to engage the automobile near one end of an axle thereof, and legs extending from said member to support said member in braced relation to it and to each other, one of said legs being pivotally connected to said member.

2. An automobile support comprising, in combination, a member adapted to engage the automobile near one end of an axle thereof, legs extending from said member to support said member in braced relation to it and to each other, said legs having provision at their other ends for attachment to the floor and one of said legs being pivotally connected to said member.

3. An automobile support comprising a plate, a pair of legs extending from said plate substantially in the plane thereof and diverging from each other when in supporting position, means for connecting said plate to a wheel of the automobile to be supported, said legs being movable relatively to each other and having provision at their ends remote from said plate for connection to the floor.

4. An automobile support comprising a rigid supporting member adapted at one end to be pivotally connected to the automobile near the end of an axle thereof and at its other end to be connected to the floor in braced relation to the automobile axle, and a second member pivoted to said first member near its point of connection with the automobile axle, said second member being adapted at its other end to be connected to the floor in braced relation to the automobile axle and also to the first mentioned member, and to support said axle with said first mentioned member at different heights determined by the distance apart of the connections of said members to the floor.

5. An automobile support comprising, in combination, a plate adapted to be connected to the hub of the automobile wheel in a plane substantially parallel to the wheel, legs extending from said plate substantially in the plane thereof, one of said legs being rigid with said plate, and the other being pivotally connected thereto, whereby they may be relatively moved into bracing relation to each other and to the wheel hub, each of said legs having provision at its end remote from said plate for connection to the floor.

Signed at Detroit, Michigan, this 24th day of February, 1921.

ALBERT E. COONEY.

Witnesses:
ALFRED H. KNIGHT,
R. E. STONE.